J. M. Kern,
Saw.
Nº 14,268.
Patented Feb. 12, 1856
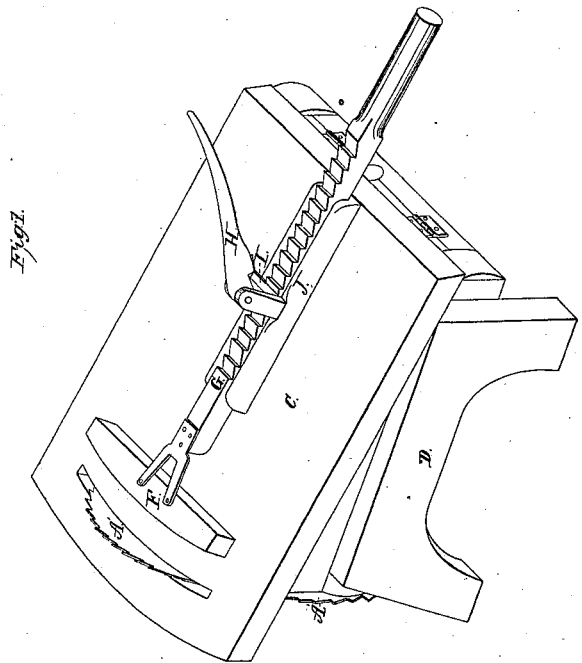
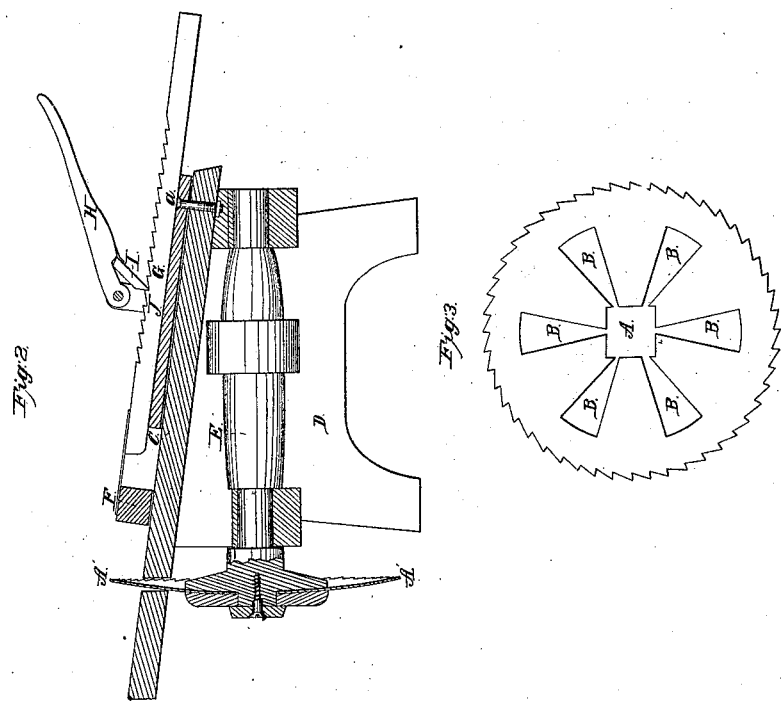

UNITED STATES PATENT OFFICE.

JAS. M. KERN, OF MORGANTOWN, VIRGINIA, ASSIGNOR TO ENOCH P. FITCH AND ISAAC SCOTT.

METHOD OF CONCAVING CIRCULAR SAWS.

Specification of Letters Patent No. 14,268, dated February 12, 1856.

*To all whom it may concern:*

Be it known that I, JAMES M. KERN, of Morgantown, in the county of Monongalia and State of Virginia, have invented certain new and useful Improvements in Making Concave or Dish-Shaped Saws; and I do hereby declare the following to be a full, clear, and exact description of the same, reference being had to the accompanying drawings, making a part thereof, in which—

Figure 1 represents in perspective the manner in which concave saws are hung and used. Fig. 2, is a longitudinal vertical section through Fig. 1, and Fig. 3, represents a side view of the saw, showing the portion cut away in the center thereof.

Similar letters where they occur in the several figures denote like parts in all.

The nature of my invention relates to the making of concave saws, for cutting curvilinear work, out of ordinary flat circular saw plates, without cutting through from the center to the periphery of the plate.

To enable others skilled in the art to make and use my invention, I will proceed to describe the same with reference to the drawings.

The common way of making concave saws, is, either to make the saw in sections, or else to cut out a wedge shaped piece from the plate, and then spring or bend up the plate into the required form, but when the plate is thus cut from the center to the periphery, it is difficult to make the edges run smooth in the kerf, as the chattering or buckling of the saw springs them out of line. My plan of making the saw is more simple and cheap, and avoids the necessity of a cut or joint leading to the periphery from the center.

I take an ordinary circular saw, and enlarge the usual opening at its center, as seen at A, Fig. 3, from this central opening, I cut out wedge shaped openings B, extending from the center toward, but not to, the periphery of the plate. Then by placing the plate thus cut upon an anvil, and drawing out the metal toward these openings, with a hammer, the plate assumes a concave form, which of course may be of any desired degree of concavity. The openings need not be of the shape, size, or number shown, as this may depend on the diameter of the saw. It is only necessary to cut away so much of the interior of saw plate, as will leave space enough to draw the excess of metal into, and in doing so the periphery of the plate is not cut, and the saw is without the slot or cut in its periphery.

Figs. 1 and 2, show the manner of hanging and using this kind of a saw. C represents a table supported on a frame D, the table standing at an inclination corresponding with the radius of concavity of the saw. E, is the arbor or shaft on which the saw is hung. F, represents the block from which the curved pieces are cut; it is secured to a notched arm G, and by means of a lever H, and pawl I, which takes into the notches, said block is fed up regularly to the saw. The inclination of the bed or table C, and the concavity of the saw A', makes the cuts or kerfs parallel, and at right angles to the top and bottom of the block, and thus staves, fellies, or any other kind of curvilinear work is cut. The arm G, slides in a grooved piece J, which grooved piece is pivoted at *a*, and thus the block is swept around in the arc of a circle corresponding with the desired curve of the piece to be sawed.

Having thus fully described the nature of my invention, what I claim herein as new and desire to secure by Letters Patent, is—

The making of a dish shaped saw from a flat circular saw plate, by cutting away a portion of the interior of the plate, and drawing a portion of the remaining metal into the spaces thus cut away, by which the desired concavity may be attained, without cutting out to the periphery of the plate.

J. M. KERN.

Witnesses:
THOS. H. UPPERMAN,
E. CHENY.